(12) United States Patent
Yang

(10) Patent No.: US 8,664,871 B2
(45) Date of Patent: Mar. 4, 2014

(54) HIGH VOLTAGE POWER SUPPLY FOR POWERING A MAGNETRON IN A UV CURING LAMP ASSEMBLY

(75) Inventor: Yixin Yang, Rockville, MD (US)

(73) Assignee: Heraeus Noblelight Fusion UV Inc., Gaithersburg, MD (US)

( * ) Notice: Subject to any disclaimer, the term of this patent is extended or adjusted under 35 U.S.C. 154(b) by 422 days.

(21) Appl. No.: 13/189,847

(22) Filed: Jul. 25, 2011

(65) Prior Publication Data

US 2012/0019148 A1 Jan. 26, 2012

Related U.S. Application Data

(60) Provisional application No. 61/367,483, filed on Jul. 26, 2010.

(51) Int. Cl.
*H05B 39/00* (2006.01)
(52) U.S. Cl.
USPC ........... 315/207; 315/277; 315/255; 315/160; 315/39.51; 307/18; 307/83; 307/87; 363/126
(58) Field of Classification Search
USPC ......... 315/101, 105, 141, 160, 165, 205, 207, 315/277, 278, 255, 39.51; 363/68, 126; 324/547, 764.01; 331/86; 307/18, 43, 307/83, 87; 219/717
See application file for complete search history.

(56) References Cited

U.S. PATENT DOCUMENTS

| | | | | | |
|---|---|---|---|---|---|
| 4,175,246 | A | * | 11/1979 | Feinberg et al. | 315/101 |
| 5,352,930 | A | * | 10/1994 | Ratz | 307/43 |
| 5,514,967 | A | * | 5/1996 | Zelm | 324/551 |
| 7,109,669 | B2 | * | 9/2006 | Bretmersky et al. | 315/308 |
| 7,746,670 | B2 | * | 6/2010 | Kawasaki et al. | 363/20 |

* cited by examiner

*Primary Examiner* — Haiss Philogene
(74) *Attorney, Agent, or Firm* — Lowenstein Sandler LLP

(57) ABSTRACT

A power supply for use in a UV curing lamp assembly is disclosed. The power supply is powered by two intermediate frequency (200-400 Hz) low voltage sinusoidal power sources that drive the primary windings of a dual laminated transformer. The low voltage sinusoidal power sources are configured to have different phases. The out-of-phase low voltage sine wave sources are converted to high voltage sine waves on the secondary windings of the dual laminated transformer having the same phase difference relationship. A single rectifier comprising six high voltage diodes, called a ladder rectifier, combine the two out-of-phase sine waves into a single, approximately DC output power source. By modulating a phase difference between two input sine wave power sources, the approximate DC output voltage exiting the ladder rectifier may be alternated between a low ripple mode of about a 13.84% ripple, a high current mode, a high voltage mode, and an intermediate mode with a ripple in the range of about 13.84% to about 100%.

22 Claims, 9 Drawing Sheets

Simulation Result when the Phase Difference is 150° (210°)

Simulation Result when the Phase Difference is 180°

HIGH VOLTAGE POWER SUPPLY FOR POWERING A MAGNETRON IN A UV CURING LAMP ASSEMBLY

CROSS-REFERENCE TO RELATED APPLICATION

This application claims the benefit of U.S. provisional patent application No. 61/367,483 filed Jul. 26, 2010, the disclosure of which is incorporated herein by reference in its entirety.

FIELD OF THE INVENTION

The invention relates generally to high voltage power supplies, and more particularly, to a dual transformer and ladder rectifier power supply for powering a magnetron in ultraviolet radiation (UV) curing lamp assemblies.

BACKGROUND OF THE INVENTION

Radiant energy is used in a variety of manufacturing processes to treat surfaces, films, and coatings applied to a wide range of materials. Specific processes include, but are not limited to, curing (i.e., fixing, polymerization), oxidation, purification, and disinfection. Processes using radiant energy to polymerize or effect a desired chemical change is rapid and often less expensive in comparison to a thermal treatment. The radiation can also be localized to control surface processes and allow preferential curing only where the radiation is applied. Curing can also be localized within the coating or thin film to interfacial regions or in the bulk of the coating or thin film. Control of the curing process is achieved through selection of the radiation source type, physical properties (for example, spectral characteristics), spatial and temporal variation of the radiation, and curing chemistry (for example, coating composition).

A variety of radiation sources are used for curing, fixing, polymerization, oxidation, purification, or disinfections due to a variety of applications. Examples of such sources include, but are not limited to, photon, electron, or ion beam sources. Typical photon sources include, but are not limited to, arc lamps, incandescent lamps, electrodeless lamps and a variety of electronic (i.e., lasers) and solid-state sources.

An apparatus for irradiating a surface with ultraviolet light includes a lamp (e.g., a modular lamp, such as a microwave-powered lamp having a microwave-powered bulb (e.g., tubular bulb) with no electrodes or glass-to-metal seals), the lamp having reflectors to direct light (photons) on to the surface. The source of microwave power is conventionally a magnetron, the same source of microwaves typically found in microwave ovens. The microwave-powered bulb typically receives microwaves generated by the magnetron through an intervening waveguide.

Conventional power supplies for magnetrons include a variety of designs. A typical design used for powering microwave ovens includes a one step-up resonant laminated transformer, a high voltage diode, and a high voltage capacitor. The transformer/capacitor combination takes a 50 Hz/60 Hz line voltage and outputs a 50/60 Hz half wave pulsed DC voltage or a 100% ripple DC voltage. It has the advantage of low cost, but includes the disadvantages of being large and heavy with a single level of output power.

A second design employs a silicon-controlled rectifier (SCR) to control an amount of phase of an input power sine waveform that may be applied to a laminated transformer. The output windings of the laminated transformer steps up the input voltage which is applied to a full diode bridge. The output is a 50 HZ/60 Hz full wave rectified pulsed DC voltage or 100% ripple DC voltage.

A third possible design is a switching mode power supply which provides a high power DC voltage with low ripple. Conventional high voltage, switching mode power supplies suffer from a number of problems. Because of a high working frequency (>20 KHz), a high frequency, high power single output winding ferrit transformer is needed, along with a small number of high voltage, fast recovery diodes arranged in a diode bridge. The small number of high power, high frequency diodes dissipate a large amount of power. As a result, it is necessary to employ a ferrit transformer with multiple secondary windings coupled to a large number of diode bridges, each comprising 2 or 4 lower voltage diodes as shown in FIG. 1.

Referring now to FIG. 1, a portion of a high voltage switching mode DC power supply 10 includes an AC pulsed input source 12 feeding a primary winding of a multiple output winding laminated transformer 14. The multiple output windings 16a-16l feed a plurality of full-wave rectified diode bridge circuits 18a-18l (also labeled DB1-DB12) requiring a total of 64 diodes. A rippled approximate DC output voltage is smoothed and high frequency components from the switching power supply are removed by a plurality of filter circuits 20a-20l each comprising at least a capacitor and an inductor, labeled C1-C12 (references 22a-22l) and L1-L12 (references 24a-24l), respectively.

Since there is typically a long cable between a power supply and a magnetron in a UV curring lamp assembly, the outputs of the secondary windings 16a-16l of the multiple winding transformer 14 include a high level of high frequency components. For the power supply 10 to drive a magnetron with low frequency DC power with a long transmission cable (not shown), it is necessary to employ a large number of inductors 24a-24l and capacitors 22a-22l, as well as 12 RC snubbers (not shown) employed as filters to remove high frequency components. Thus, a large number of diodes, inductors and capacitors need to be employed, which is expensive, consumes a large amount of board space, and reduces reliability.

Accordingly, what would be desirable, but has not yet been provided, is an inexpensive high voltage and power output DC power supply having a low component count.

SUMMARY OF THE INVENTION

The above-described problems are addressed and a technical solution achieved in the art by providing a high voltage, high power output power supply for driving a magnetron in a UV curing lamp assembly. The high voltage, high power output power supply includes two intermediate frequency (200-400 Hz) low voltage sinusoidal power sources that are configured to drive the primary windings of a dual laminated transformer. The low voltage sinusoidal power sources are configured to have different phases. The out-of-phase low voltage sine wave sources are converted to high voltage sine waves on the secondary windings of the dual laminated transformer having the same phase difference relationship. A single rectifier comprising six high voltage diodes, called a ladder rectifier, combines the two out-of-phase sine waves into a single, approximately DC output signal.

The ladder rectifier rectifies the two sine wave AC output sources into one of various modes of DC power, which range from high output voltage to high output current depending on a predetermined phase difference between the two input sine wave sources. The approximate DC output signal exiting the ladder rectifier contains a ripple with intermediate frequencies, which cover the spectrum range of 400 Hz to 6.4 KHz. As a result, no filtering inductors or capacitors are needed following the ladder rectifier, thereby providing a low cost, low component count solution for driving a magnetron in a UV curing lamp assembly. The circuit is operable to supply high voltage, high power over a long cable between the power supply and the magnetron.

By modulating a phase difference between two input sine wave power sources, the approximate DC output signal exiting the ladder rectifier may be alternated between a number of output modes: (1) a low ripple mode having an input power source phase difference of 60° and having an output voltage ripple as low as 13.84%; (2) a high current mode having an input power source phase difference of 0°; (3) a high voltage mode having an input power source phase difference of 180°; or (4) an intermediate mode with a ripple in the range of about 13.84% to about 100%. The mode changes may be implemented dynamically using hardware and/or software.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
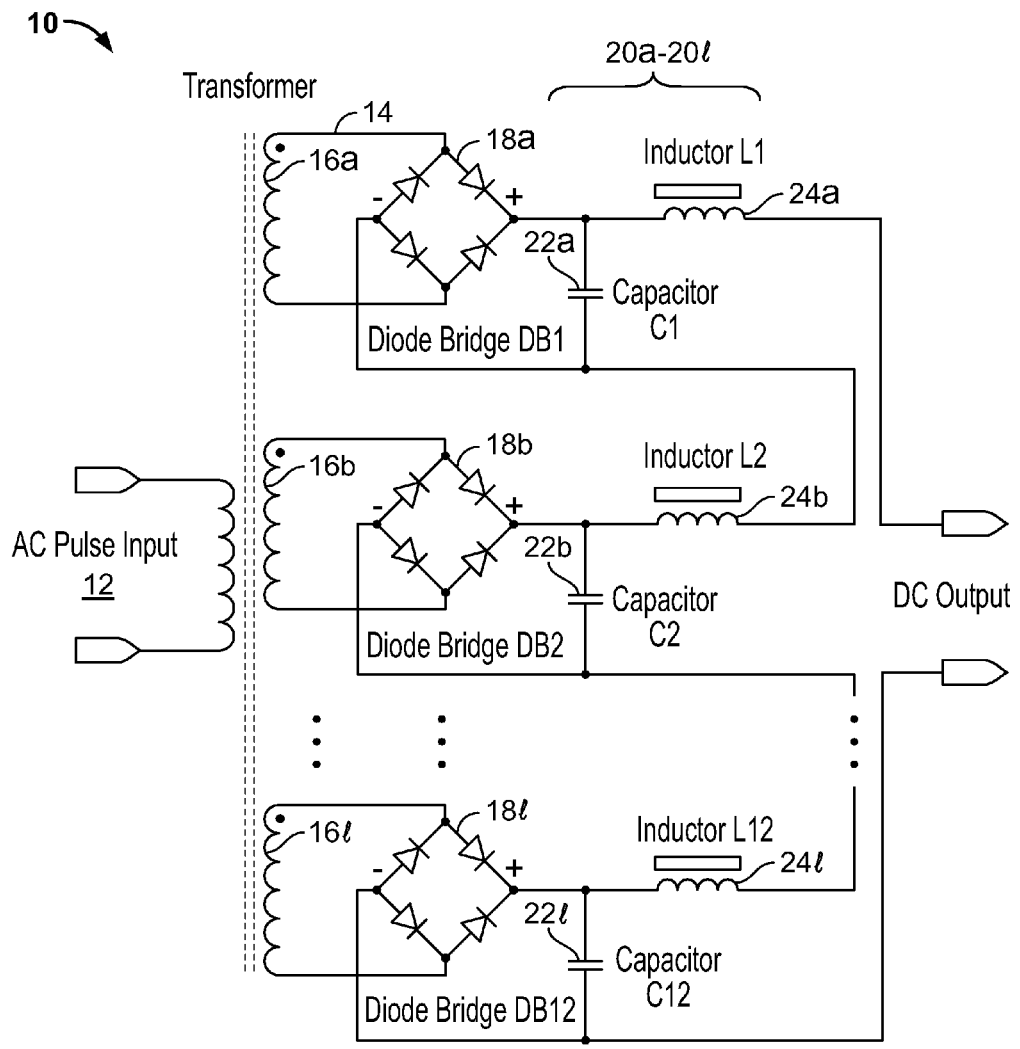
FIG. 1 depicts a portion of a conventional high voltage switching mode power supply for driving a magnetron in UV curing applications.
Figure 2:
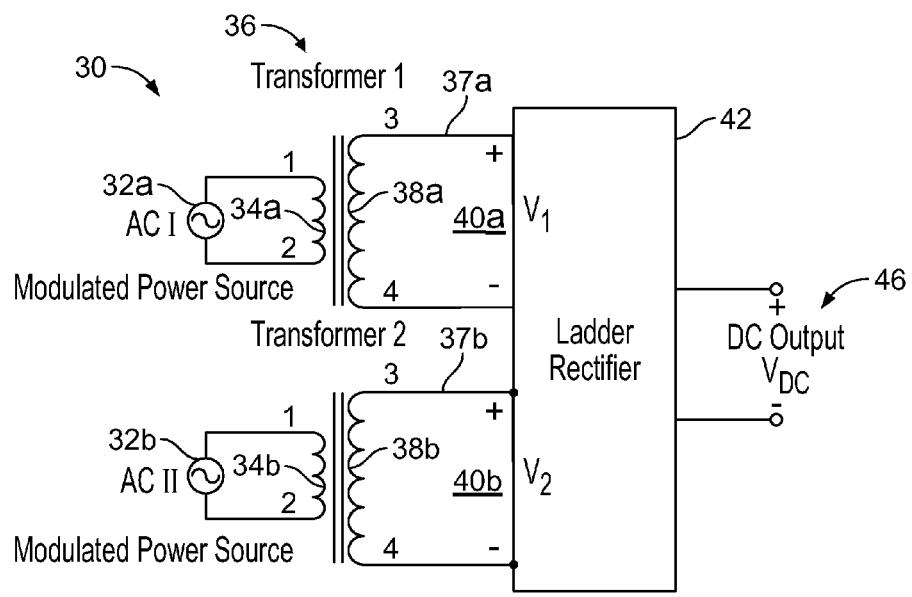
FIG. 2 shows a high level block diagram of a power supply for driving a magnetron for UV curing applications, according to an embodiment of the present invention.
Figure 3:
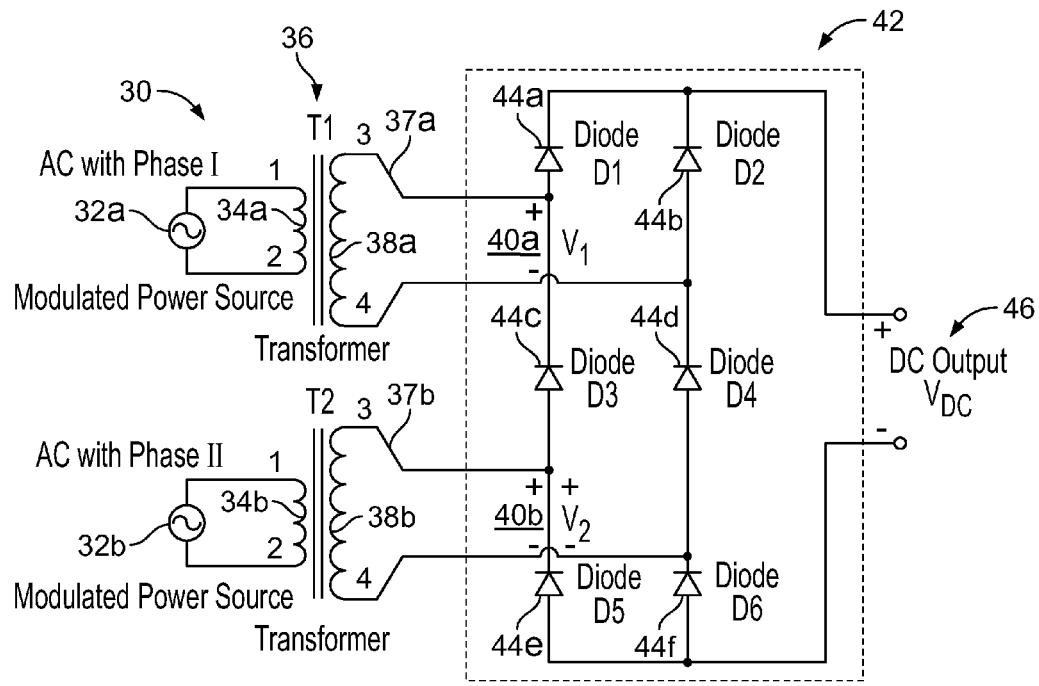
FIG. 3 shows a detailed circuit schematic of the power supply of FIG. 2 which employs a ladder rectifier circuit, according to an embodiment of the present invention.

FIG. 2 shows a high level block diagram and FIG. 3 shows a detailed circuit schematic of a power supply 30 for driving a magnetron for UV curing applications, according to an embodiment of the present invention. Referring now to FIGS. 2 and 3, the power supply 30 includes a pair of modulated AC power sources 32a, 32b, each having the substantially the same predetermined amplitude and frequency, but having a variable phase relationship. The AC power sources 32a, 32b, are electrically connected to a pair of input windings 34a, 34b of a dual laminated transformer 36, or, alternatively, matched transformers 37a, 37b (also labeled T1 and T2), respectively. The dual laminated transformer 36 steps up the voltage of the AC power sources 32a, 32b on a pair of output windings 38a, 38b. The output windings 38a, 38b are electrically connected to a pair of input ports 40a, 40b of a ladder rectifier circuit 42 to be described hereinbelow. The ladder rectifier circuit 42 comprises a total of six diodes 44a-44f (also labeled D1-D6, respectively), configured as shown. The ladder rectifier circuit 42 has a single DC output port 46.

As a non-limiting example of the operation of the power supply 30, $V_{DC}$ is defined as the voltage across output port 46, V is the peak voltage present across either of the pair of output windings 38a, 38b, and V1 and V2 are the instantaneous voltages across each of the pair of output windings 38a, 38b, respectively. At any one moment, V1=V sine θ and V2=V sine (θ−Φ), where θ is an angle within one period of sinusoidal wave of V1 and Φ is the phase difference between V1 and V2. When Φ is a predetermined value, current may pass through the ladder rectifier circuit 42 in one of six different paths as follows:

When V1>0 and V2<0, D1, D4 and D5 (i.e., 44a, 44d, and 44e, respectively) are forward biased, while the diodes D2, D3, and D6 (i.e., 44b, 44c, and 44f, respectively) are reverse biased. As a result, current flows though D1, D4 and D5, such that the output voltage is $V_{DC}$=V1+|V2|=V sine θ+|V sine (θ−Φ)|=V[sine θ−sine (θ−Φ)].

When V1>V2>0, D1, D4 and D6 (i.e., 44a, 44d, and 44f, respectively) are forward biased, while the diodes D2, D3, and D5 (i.e., 44b, 44c, and 44e, respectively) are reverse biased. As a result, current flows though D1, D4 and D6, such that the output voltage is $V_{DC}$=V1=V sine θ.

When V2>V1>0, D1, D3 and D6 (i.e., 44a, 44c, and 44f, respectively) are forward biased, while the diodes D2, D4, and D5 (i.e., 44b, 44d, and 44e, respectively) are reverse biased. As a result, current flows though D1, D3, and D6, such that the output voltage is $V_{DC}$=V2=V sine (θ−Φ).

When V1<0 and V2>0, D2, D3 and D6 (i.e., 44b, 44c, and 44f, respectively) are forward biased, while the diodes D1, D4, and D5 (i.e., 44a, 44d, and 44e, respectively) are reverse biased. As a result, current flows though D2, D3, and D6, such that the output voltage is $V_{DC}$=|V1|+V2=|V sine θ|+V sine (θ−Φ)=V[sine (θ−Φ)−sine θ].

When V1<V2<0, D2, D3 and D5 (i.e., 44b, 44c, and 44e, respectively) are forward biased, while the diodes D1, D4, and D6 (i.e., 44a, 44d, and 44f, respectively) are reverse biased. As a result, current flows though D2, D3 and D5, such that the output voltage is $V_{DC}=|V1|=|V$ sine $\theta|=-V$ sine $\theta$.

When V2<V1<0, D2, D4 and D5 (i.e., 44b, 44d, and 44e, respectively) are forward biased, while the diodes D1, D3, and D6 (i.e., 44a, 44c, and 44f, respectively) are reverse biased. As a result, current flows though D2, D4 and D5, such that the output voltage is $V_{DC}=|V2|=|V$ sine $(\theta-\Phi)|=-V$ sine $(\theta-\Phi)$.

In different time intervals, the voltage across output port 46, $V_{DC}$, may be either V1 or V2 from one transformer (whichever amplitude is larger than that of the other) or the voltage summation |V1|+|V2| from two transformers together when V1 and V2 are inverted. The instantaneous phase difference between the sinusoidal waveforms of the voltages V1 and V2 across the pair of the output windings 38a, 38b, is the factor that determines the DC output mode of the ladder rectifier circuit 42. When the phase difference is fixed, the output mode (i.e., the RMS voltage and ripple voltage) is fixed.

Figure 4:
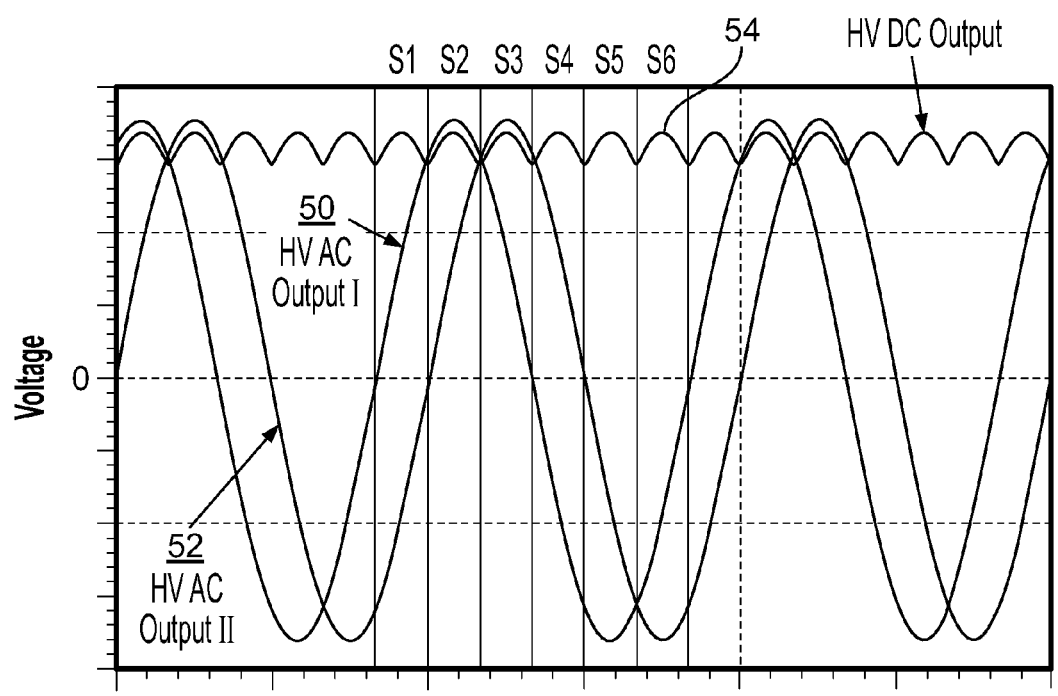
FIG. 4 is a graph of a set of voltage waveforms at both the inputs and output of the ladder rectifier circuit of FIGS. 2 and 3 having a phase difference between V1 and V2 of 60° (minimum ripple mode)

FIG. 4 is a graph of a set of voltage waveforms at both the inputs and output of the ladder rectifier circuit 42, respectively. The waveform 50 is the voltage at the output winding 38a of the dual laminated transformer 36 (also labeled HV AC output I); the waveform 52 is the voltage at the output winding 38b of the dual laminated transformer 36 (also labeled HV AC output II); and the waveform 54 is a portion of the composite voltage at the a DC output port 46 of the ladder rectifier circuit 42, $V_{DC}$ (also labeled HV DC output). The waveform 54 exhibits a distinct ripple. When the phase difference between waveforms 50 and 52 is about $\Phi=60°$, one period of the output waveform 54 may be divided into six time sections, S1, S2, S3, S4, S5 and S6, each section covering 60 degrees of phase and described as follows:

In time section S1, 0<θ<60°, V1>0 and V2<0, and output current passes through D1, D4 and D5. Both of the output windings 38a, 38b provide power to the load and $V_{DC}=V$ [sine θ−sine (θ−60°)].

In time section S2, 60°<θ<120°, V1>V2>0, and output current passes through D1, D4 and D6. Only the output windings 38a provides power to the load and $V_{DC}=V1=V$ sine θ.

In time section S3, 120°<θ<180°, V2>V1>0, the output current passes through D1, D3 and D6. Only the output windings 38b provides power to the load. $V_{DC}=V2=V$ sine (θ−60°).

In time section S4, 180°<θ<240°, V1<0 and V2>0, the output current passes through D2, D3 and D6. Both of the output windings 38a, 38b provide power to the load and $V_{DC}=V$ [sine (θ−60°)−sine θ].

In time section S5, 240°<θ<300°, V1<V2<0, the output current passes through D2, D3 and D5. Only the output windings 38a provides power to the load. $V_{DC}=-V$ sine θ.

In time section S6, 300°<θ<360°, V2<V1<0, the output current passes through D2, D4 and D5. Only the output windings 38b provides power to the load. $V_{DC}=-V$ sine (θ−60°).

For the waveforms of FIG. 4, $\Phi=60°$, which corresponds to a minimum ripple mode, where the percentage DC output ripple is about 13.84% in theory. The output ripple is defined as the percentage of peak-to-peak voltage of ripple divided by the RMS voltage value of a corresponding DC output. In the example of minimum ripple, using a unity V value, i.e., V=1, the ripple may be calculated by the formula (1−sine (90°−60°/2))/RMS of $V_{DC}=(1-0.866)/0.968=13.84\%$.

FIGS. 5A-5F are graphs of a set of voltage waveforms at both the inputs and output of the ladder rectifier circuit 42, respectively, for various phase differences between V1 and V2, according to an embodiment of the present invention, wherein like reference numbers correspond to similar waveforms. In general, given an arbitrary phase difference between V1 and V2, the time sections, S1-S6 are not divided into six equal sections. The width of the time sections S1-S6 depends upon the amplitude relationship between V1 and V2. The only other equal size time sections occur when $\Phi=0°$ or 180°.

Figure 5A:
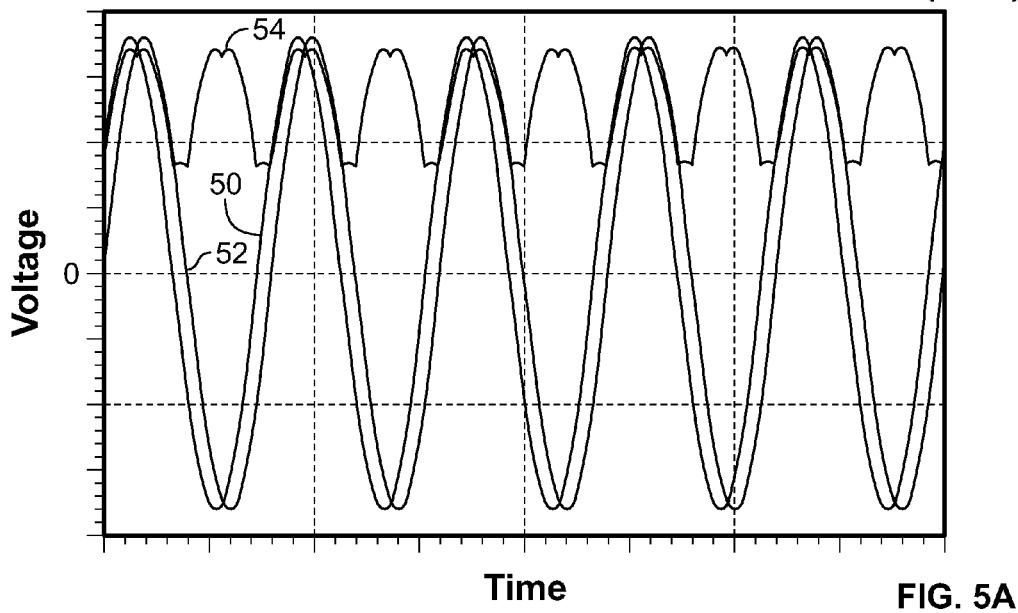
FIG. 5A is a graph of a set of voltage waveforms at both the inputs and output of the ladder rectifier circuit of FIGS. 2 and 3 having a phase difference between V1 and V2 of 30° (330°)
Figure 5B:
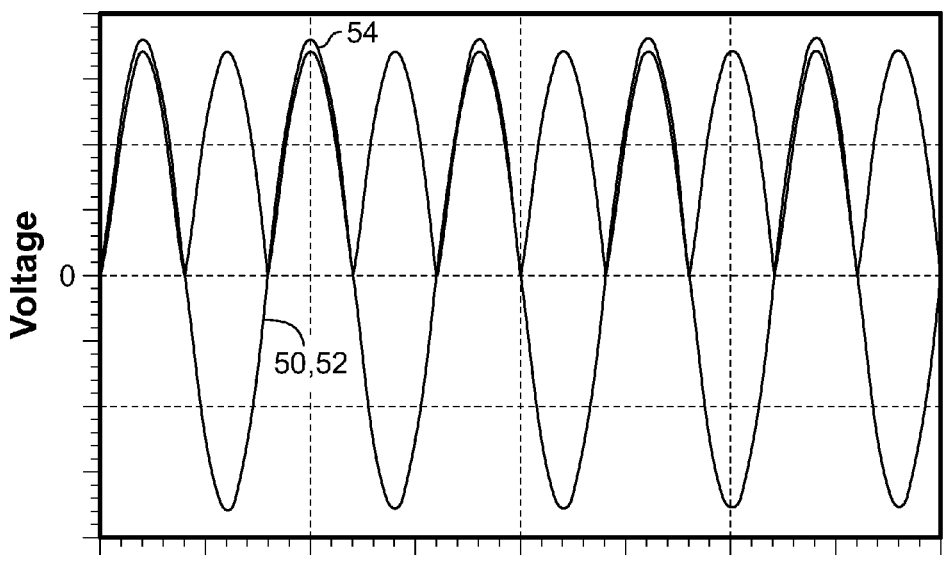
FIG. 5B is a graph of a set of voltage waveforms at both the inputs and output of the ladder rectifier circuit of FIGS. 2 and 3 having a phase difference between V1 and V2 of 0° (360°)
Figure 5C:
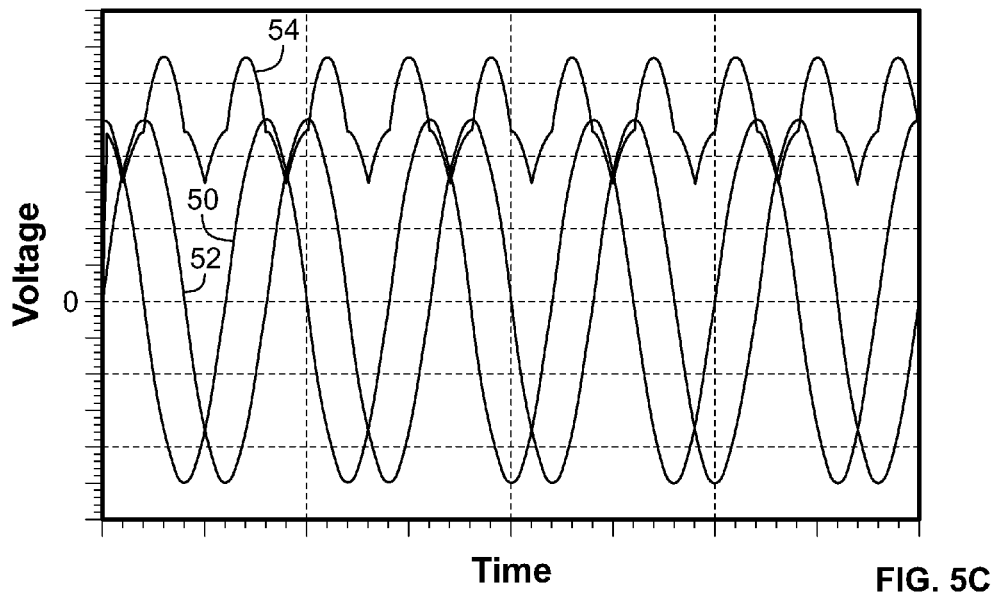
FIG. 5C is a graph of a set of voltage waveforms at both the inputs and output of the ladder rectifier circuit of FIGS. 2 and 3 having a phase difference between V1 and V2 of 90° (270°)
Figure 5D:
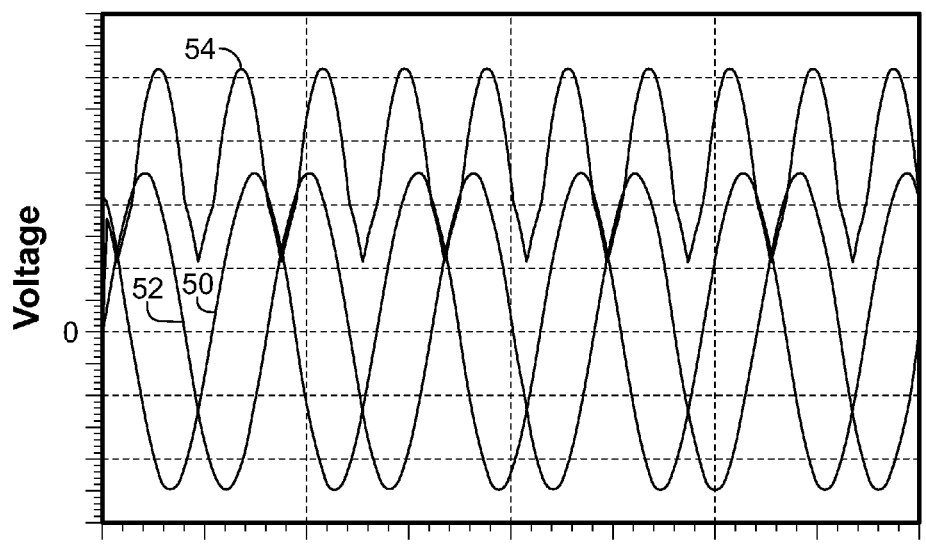
FIG. 5D is a graph of a set of voltage waveforms at both the inputs and output of the ladder rectifier circuit of FIGS. 2 and 3 having a phase difference between V1 and V2 of 120° (240°)
Figure 5E:
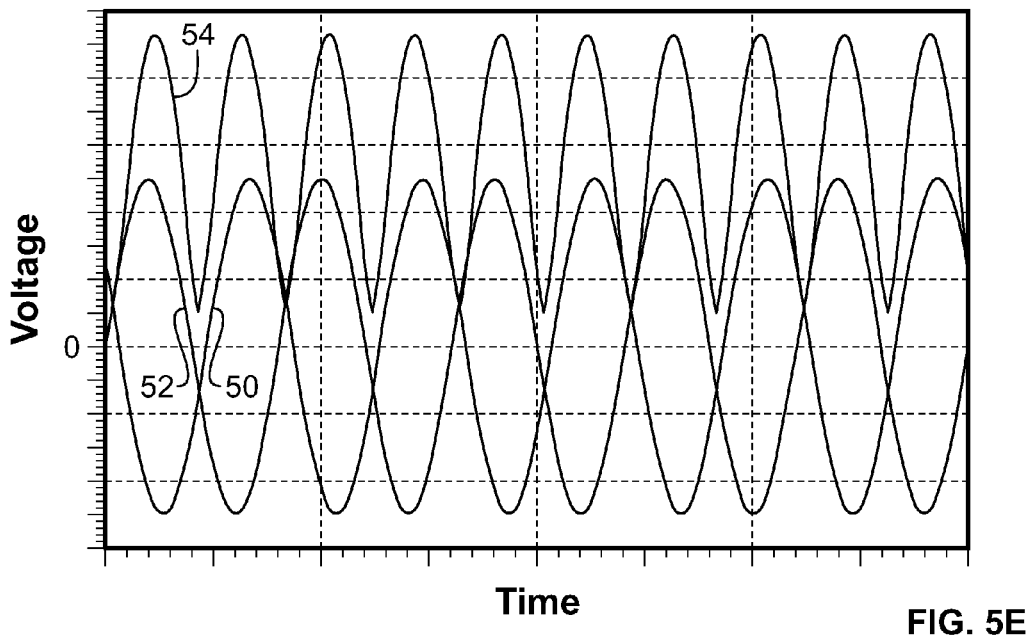
FIG. 5E is a graph of a set of voltage waveforms at both the inputs and output of the ladder rectifier circuit of FIGS. 2 and 3 having a phase difference between V1 and V2 of 150° (210°)
Figure 6A:
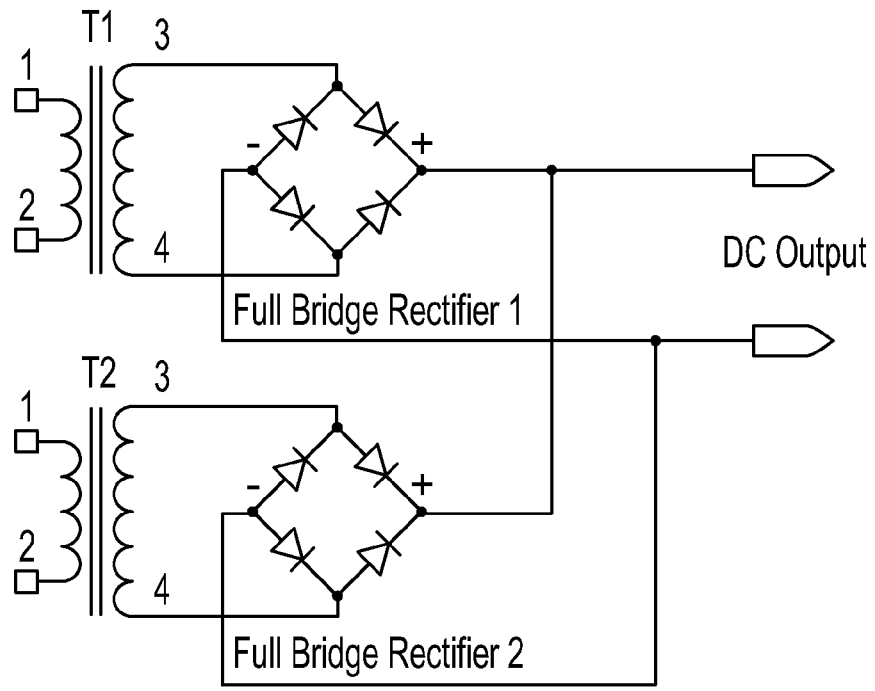
FIG. 6A depicts an equivalent circuit for the ladder rectifier of FIG. 3 in a maximum current mode.

At a phase difference of $\Phi=0°$, the DC output voltage $V_{DC}=|V1|=|V2|=|V|$ sine $\theta|$ as shown in FIG. 5B. When |V1|=|V2| with zero phase difference, there are only two time sections, S1 and S2 of waveform 54. In time section S1, 0<θ<180°, and V1=V2>0. Output current passes through D1, D3, D4 and D6, and $V_{DC}=V$ sine θ. In time section S2, 180<θ<360°, V1=V2<0. Output current passes through D2, D3, D4 and D5, and $V_{DC}=-V$ sine θ. The output current is provided by both T1 and T2, and each transformer transmits half of the current all of the time. Therefore, when $\Phi=0°$, the ladder rectifier circuit 42 is in a maximum current mode, which is equivalent to the circuit depicted in FIG. 6A.

Figure 5F:
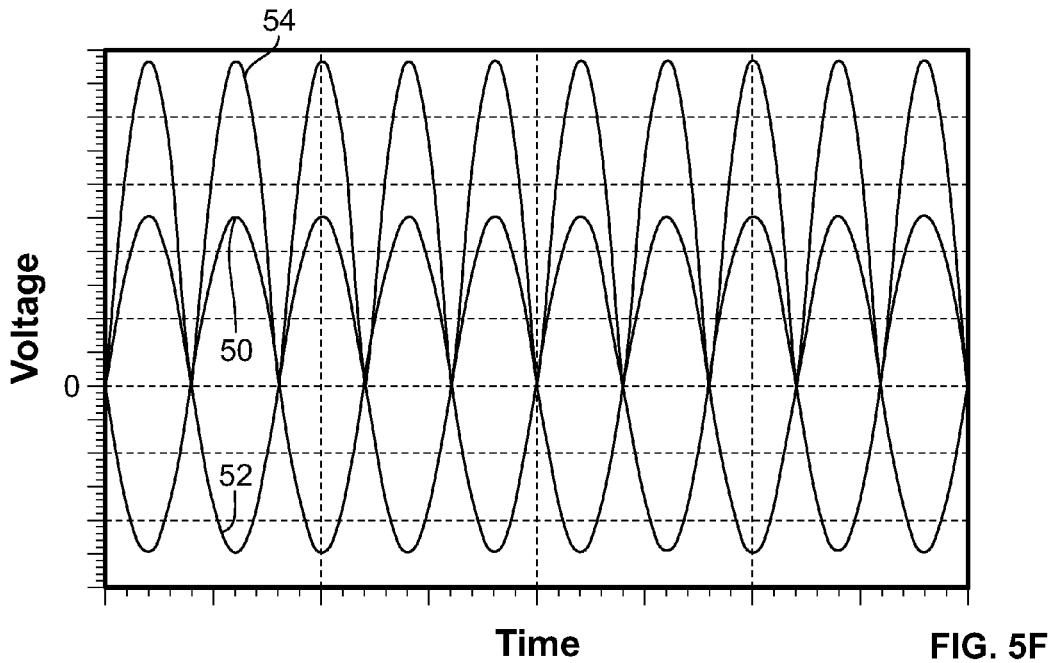
FIG. 5F is a graph of a set of voltage waveforms at both the inputs and output of the ladder rectifier circuit of FIGS. 2 and 3 having a phase difference between V1 and V2 of 180°.
Figure 6B:
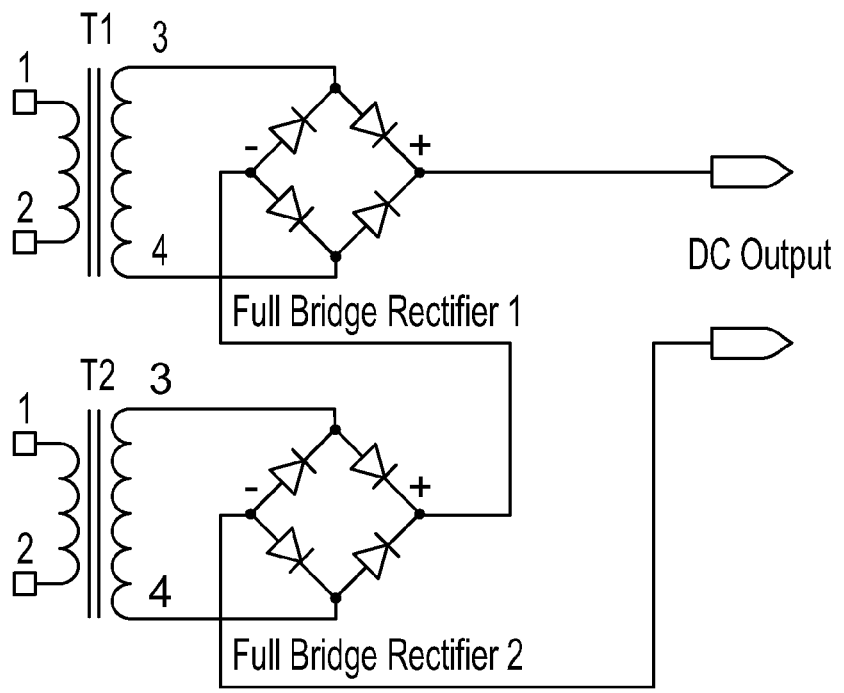
FIG. 6B depicts an equivalent circuit for the ladder rectifier of FIG. 3 in a maximum voltage mode.

At a phase difference $\Phi=180°$, the DC output voltage is $V_{DC}=|V1|+|V2|=2 |V|$ sine $\theta|$ as shown in FIG. 5F. When |V1|=|V2| with 180° phase difference, there are only two time sections S1 and S2 of waveform 54. In time section S1, 0<θ<180°, V1>0 and V2<0, $V_{DC}=V1-V2=V$[sine θ−sine (θ−180°)]=2 V sine θ. In time section S2, 180<θ<360°, V1<0 and V2>0, $V_{DC}=-V1+V2=V$[sine (θ−180°)−V sine θ]=−2 V sine θ. The output power is provided by both T1 and T2 transmit equal current and double the voltage of either V1 or V2. Therefore, when $\Phi=180°$, the ladder rectifier circuit 42 is in a maximum voltage mode, which is equivalent to the circuit depicted in FIG. 6B.

In summary, embodiments of the present invention may be developed as a power supply with multiple output features. Changing the phase difference between the modulated power sources AC 1 and AC 2, may represent the following modes:

$\Phi=60°$ phase difference providing a low ripple mode with 13.84% ripple.

$\Phi=0°$ phase difference providing a high current mode with 100% ripple.

$\Phi=180°$ phase difference providing a high voltage mode with 100% ripple.

Other phase differences provide various modes ranging between high current mode and high voltage mode with ripple ranging between about 13.84% and about 100%.

Figure 7:
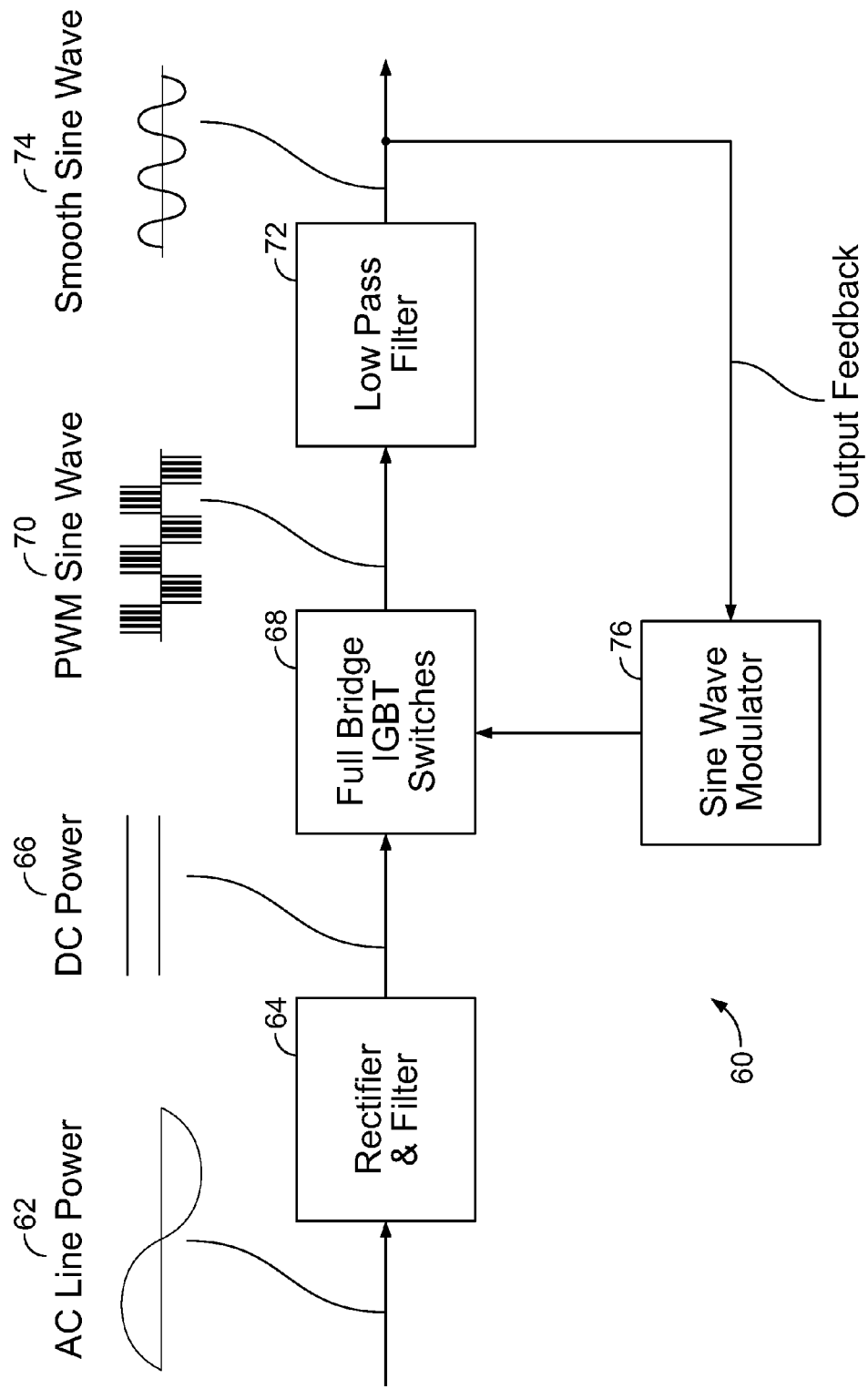
FIG. 7 is a block diagram of a suitable circuit known in the art for providing each of the 200-400 Hz AC input power sources of FIGS. 2 and 3 from an input 50/60 Hz power line.

For high power applications, a block diagram of a suitable circuit 60 known in the art for providing each of the 200-400 Hz AC power sources 32a, 32b of FIGS. 2 and 3 from an input 50/60 Hz power line is depicted in FIG. 7. The input 50/60 Hz power line voltage 62 is passed through a rectifier and filter circuit 64, which converts the input power line voltage to an approximate DC power 66. The approximate DC power 66 is chopped into a PWM (Pulse Width Modulation) sine wave 70, which is a series of pulses resulting in a sine-like flux density waveform using a full bridge IGBT (Insulated Gate Bipolar Transistor) switch 68. The chopping frequency of the full bridge IGBT switches is at least 100 times that of the PWM sine wave 70 frequency. For example, if the frequency of PWM sine wave is 300 Hz, the chopping frequency is more than 30 KHz. This PWM sine wave 70 in the form of a smooth sine wave 74 having a frequency in the range of 200 Hz to 400 Hz is produced by a low pass filter 72. The output signal 74 is fed back to the full bridge switcher circuit 68 by a sine wave modulator circuit 76.

Figure 8:
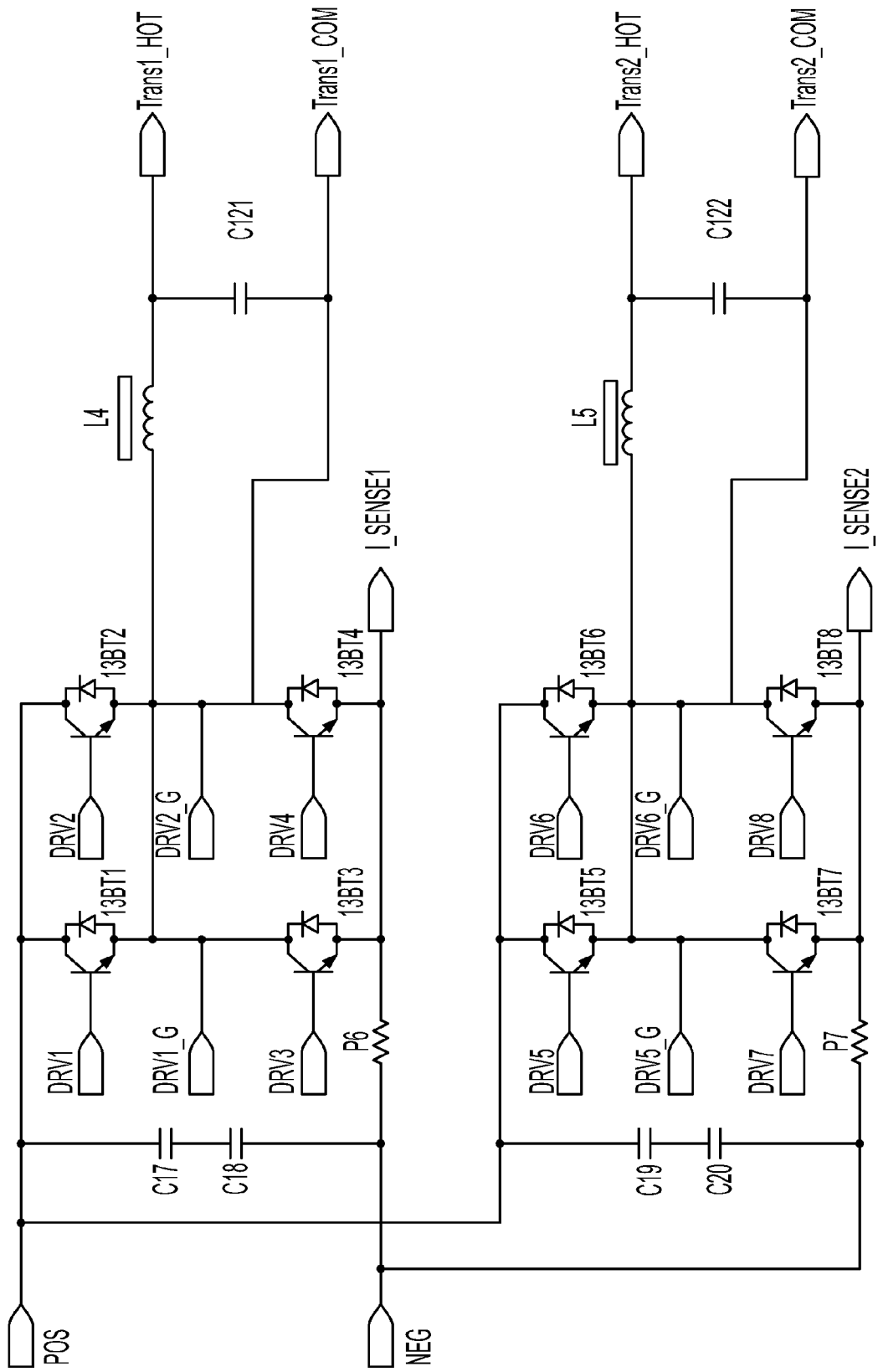
FIG. 8 is a circuit schematic diagram of a suitable circuit for generating the 200-400 Hz AC power sources of FIGS. 2 and 3 from an input 50/60 Hz power line.

Alternatively, a suitable circuit for generating both of the 200-400 Hz AC power sources 32a, 32b of FIGS. 2 and 3 from an input 50/60 Hz power line is depicted in FIG. 8.

It is to be understood that the exemplary embodiments are merely illustrative of the invention and that many variations of the above-described embodiments may be devised by one skilled in the art without departing from the scope of the invention.

What is claimed is:

1. A power supply for powering a magnetron in an ultraviolet radiation (UV) curing lamp assembly, comprising:
   at least two transformers comprising a plurality of primary windings and a plurality of secondary windings;
   a plurality of low voltage power sources electrically connected to the plurality of primary windings of the at least two transformers; and
   a ladder rectifier electrically connected to the plurality of secondary windings of the at least two transformers and configured to combine a signal received from each of the plurality of low voltage power sources into a single high voltage power source.

2. The power supply of claim 1, wherein the ladder rectifier comprises a plurality of diodes configured to respond to a difference in phase among the plurality of low voltage power sources by producing a variable ripple voltage in the single high voltage power source.

3. The power supply of claim 2, wherein the variable ripple voltage is operable to produce a minimum ripple mode, a maximum output voltage mode, and a maximum output current mode output.

4. The power supply of claim 1, wherein each of the at least two transformers comprises a single input winding and a single output winding.

5. The power supply of claim 1, wherein the at least two transformers are laminated.

6. The power supply of claim 1, wherein the plurality of low voltage power sources are configured to produce sinusoidal waveforms.

7. The power supply of claim 1, wherein the plurality of low voltage power sources are configured to have substantially the same amplitude.

8. The power supply of claim 1, wherein the plurality of low voltage power sources are configured to have substantially the same frequency.

9. The power supply of claim 8, wherein the frequency ranges between 200 Hz and 400 Hz.

10. The power supply of claim 1, wherein the plurality of low voltage power sources are configured to have a fixed phase relationship.

11. The power supply of claim 1, wherein the plurality of low voltage power sources are configured to have a variable phase relationship.

12. The power supply of claim 11, wherein the variable phase relationship is programmable.

13. A method for operating a power supply for powering a magnetron in an ultraviolet (UV) curing lamp assembly, comprising the step of:
   providing at least two transformers comprising a plurality of primary windings and a plurality of secondary windings;
   applying a plurality of low voltage power sources to the plurality of primary windings; and
   combining a signal received from each of the plurality of low voltage power sources via the secondary windings into a single high voltage power source.

14. The method of claim 13, wherein the step of combining further comprises the step of responding to a difference in phase among the plurality of low voltage power sources by producing a variable ripple voltage in the single high voltage power source.

15. The method of claim 14, wherein the variable ripple voltage is operable to produce a minimum ripple mode, a maximum output voltage mode, and a maximum output current mode output.

16. The method of claim 13, wherein the difference in phase ranges between 0° and 360°.

17. The method of claim 13, wherein the plurality of low voltage power sources are configured to have substantially the same amplitude.

18. The method of claim 13, wherein the plurality of low voltage power sources are configured to have substantially the same frequency.

19. The method of claim 18, wherein the frequency ranges between 200 Hz and 400 Hz.

20. The method of claim 13, wherein the plurality of low voltage power sources are configured to have a fixed phase relationship.

21. The method of claim 13, wherein the plurality of low voltage power sources are configured to have a variable phase relationship.

22. The method of claim 21, wherein the variable phase relationship is programmable.

* * * * *